F. A. JACQUET
Gas Stove.

No. 90,846.

2 Sheets—Sheet 1.

Patented June 1, 1869.

Witnesses.

Inventor.
F. A. Jacquet
by atty
H. Pollok

F. A. JACQUET.

Gas Stove.

No. 90,846.

2 Sheets—Sheet 2.

Patented June 1, 1869.

Witnesses:

Inventor.
F. A. Jacquet
by atty
A. Pollok

United States Patent Office.

FRANÇOIS ALPHONSE JACQUET, OF PARIS, FRANCE.

Letters Patent No. 90,846, dated June 1, 1869.

GAS-HEATING AND COOKING APPARATUS.

The Schedule referred to in these Letters Patent and making part of the same.

*To whom it may concern:*

Be it known that I, FRANÇOIS ALPHONSE JACQUET, of Paris, in the Empire of France, have invented certain new and useful Improvements in Apparatus for Cooking and Heating by Gas; and I hereby declare the following to be a full, clear, and exact description of the same, reference being had to the accompanying drawings, in which—

Figure 1:
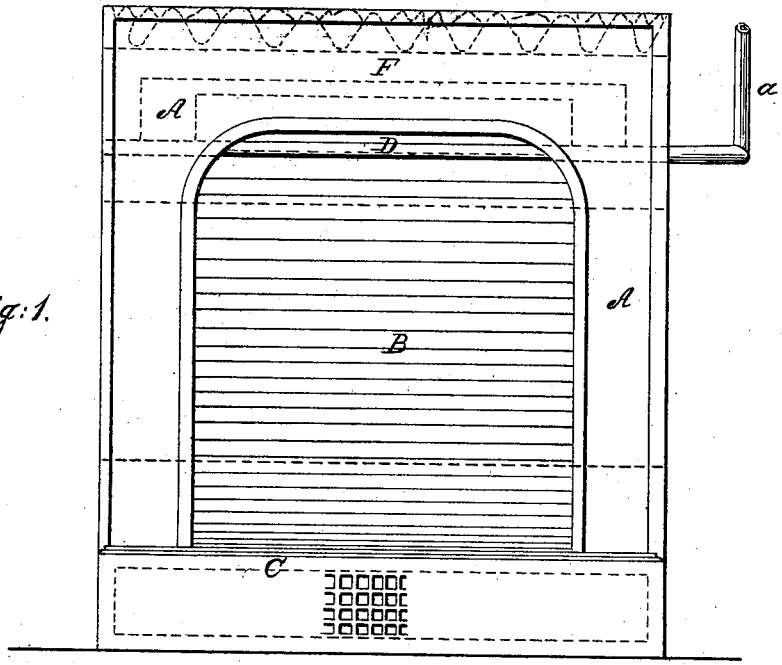
Figure 2:
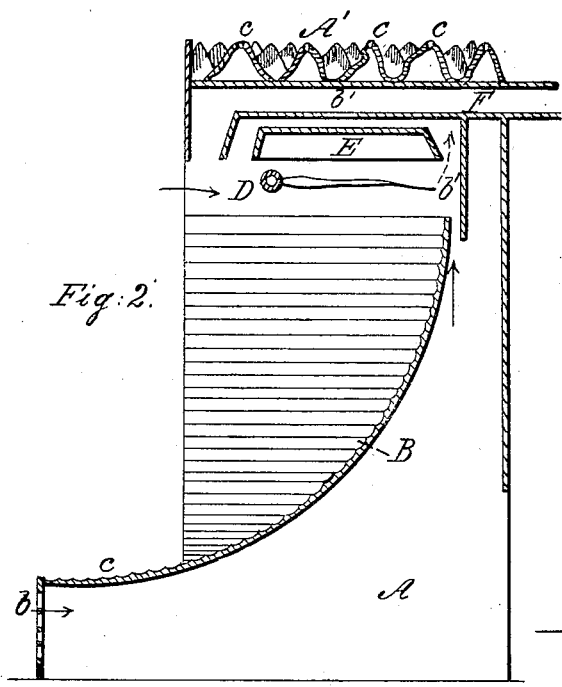

Figure 1 represents a front view, and
Figure 2, a vertical section of a portable apparatus for heating by means of gas.

A is a box or case of cast or sheet-iron, forming the body of the apparatus, which can be located in any apartment requiring warming, and which may be placed in the fire-place of such apartment.

An enamelled or polished reflector, B, is adjusted to the bottom C of the case A, and extends in a curve upward nearly as high as the gas-burner D.

The burner D is composed of a pipe bent at one end, and provided with a series of minute holes or jets. The gas enters through a gutta-percha tube, $a$, and when lighted, is reflected by the reflector B into the apartment, so as to heat and illuminate it.

Air passes through the perforated base C, as indicated by arrows $b$, forming a double current, which completes the combustion of the gas.

Above the burner D is a kind of cap or inverted basin, E, which deflects the gas, and causes it to follow the course indicated by arrows $b'$ before the smoke can escape into the conduit F.

The top of the apparatus resembles in some sort a block, A', of charcoal, which is pierced with holes $c$, through which the heat can pass into the apartment.

It will be noticed that the apparatus thus constructed is characterized by a combination, within the outer case or box, of one or more gas-jets, a curved reflector, and an arrangement of parts for producing a double current of air, and for causing the circulation of the smoke or products of combustion before their discharge, in such manner as to consume them as completely as possible.

Figure 3:
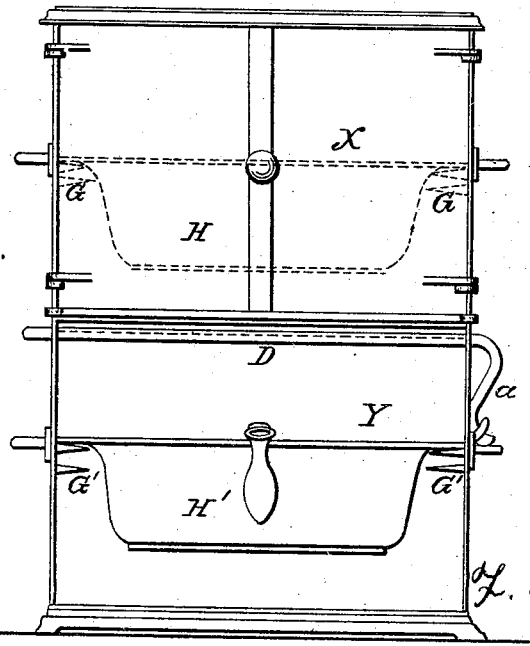
Figure 4:
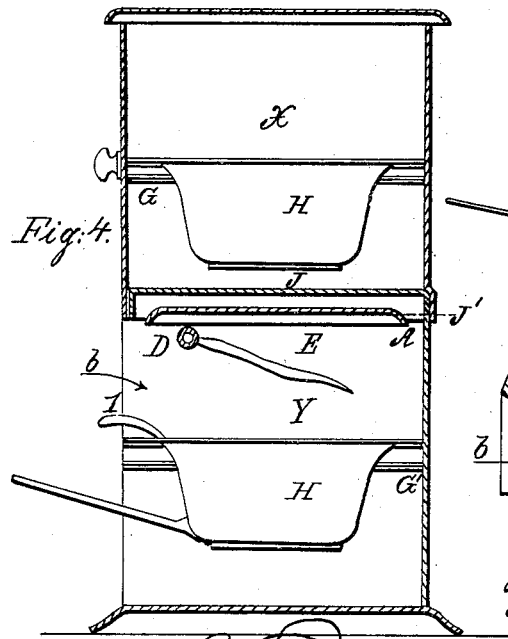

Figure 3 is a front elevation, and
Figure 4 is a vertical section of an apparatus for cooking by gas, which, however, does not embody the essential features claimed in this patent.

The gas-conducting tube $a$ is fitted to the end of the burner D, constructed as above described.

Narrow flanges or shelves G G', on each side, receive the vessels H H', which contain the food to be cooked.

The apparatus can be subdivided into two parts, the upper one, X, the lower one, Y.

A gridiron, I, fig. 4, can be placed in the vessel H'.
The part X of the apparatus forms an ordinary oven, and the metallic plate J can be used for baking, (when the part X has been removed.)

This plate is immediately over the burner D, and there is nothing between the two, except the deflecting-cap or basin E.

The arrows $b$ $b'$ indicate the course of the air and smoke.

Behind the plate J, an inclined passage, J', is formed to establish a current of air.

Figure 5:
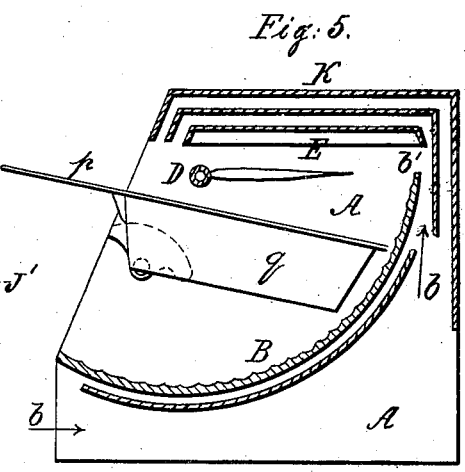

Figure 5 is a vertical section of an apparatus, which can be employed for both cooking and heating.

The arrangement of parts here represented resembles that shown in figs. 1 and 2; that is to say, the apparatus comprises the case A, metallic reflector B, gas-burner D, deflecting-cap E, and has a double circulation of the air and gas, as indicated by arrows $b$ $b'$.

When it is desired to use the apparatus for broiling or roasting, the gridiron or roasting-pan is placed as shown at $p$ and $q$. When, however, the food is only to be baked or reheated, the vessel containing it can be placed on the top K.

Figure 6:
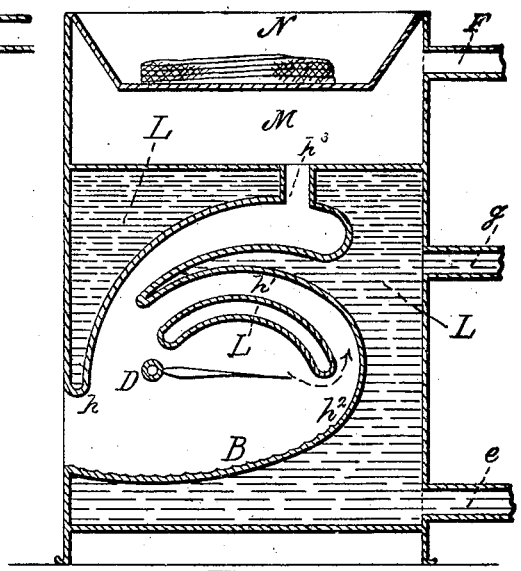

The apparatus represented in vertical section, fig. 6, is designed for heating water for a bath-room.

Water enters the apparatus through the tube $e$, which communicates with the bath-room, and after being heated, returns through the upper tube $g$.

The water is held in the receiver L, and is subjected to the action of the gas from jet D.

The receiver L is so formed as to leave passages $h$ $h^1$ $h^2$, through which the smoke and flame pass.

The smoke passes off through an aperture, $h^3$, into a chamber, M, provided with the escape-pipe F.

A chamber or receptacle, N, is formed on top of the apparatus, to receive and keep at the proper temperature the linen, towels, &c.

In this apparatus the radiation of heat from reflector B is utilized to further heat the water.

In conclusion, I would state that I am aware that reflectors have been before used in gas-heating and cooking apparatus, and I make no claim to their employment in this connection; but What I do claim, and desire to secure by Letters Patent, is—

A portable apparatus for cooking or heating, or both cooking and heating by gas, in which the air-deflector and the reflector are arranged, with relation to the gas-jet, so as to produce a double current of air, substantially as shown and described.

In testimony whereof, I have signed my name to this specification, before two subscribing witnesses.

F. A. JACQUET.

Witnesses:
C. LAFOND,
F. OLCOTT.